(12) United States Patent
Cherubini et al.

(10) Patent No.: US 9,390,759 B2
(45) Date of Patent: Jul. 12, 2016

(54) SKEW ESTIMATION FOR A TAPE STORAGE DEVICE

(71) Applicant: International Business Machines Corporation, Armonk, NY (US)

(72) Inventors: Giovanni Cherubini, Rueschlikon (CH); Simeon Furrer, Rueschlikon (CH); Jens Jelitto, Rueschlikon (CH); Kazuhiro Tsuruta, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/679,070

(22) Filed: Apr. 6, 2015

(65) Prior Publication Data

US 2015/0302875 A1 Oct. 22, 2015

(30) Foreign Application Priority Data

Apr. 16, 2014 (GB) .................................. 1406870.4

(51) Int. Cl.
| | | |
|---|---|---|
| G11B 27/19 | (2006.01) | |
| G11B 5/584 | (2006.01) | |
| G11B 5/008 | (2006.01) | |
| G11B 20/10 | (2006.01) | |

(52) U.S. Cl.
CPC ............ *G11B 27/19* (2013.01); *G11B 5/00826* (2013.01); *G11B 5/584* (2013.01); *G11B 20/10259* (2013.01)

(58) Field of Classification Search
None
See application file for complete search history.

(56) References Cited

U.S. PATENT DOCUMENTS

| | | | |
|---|---|---|---|
| 6,430,008 B1 | 8/2002 | Trabert et al. | |
| 7,365,929 B2 * | 4/2008 | Cherubini | G11B 5/59688 360/73.12 |
| 7,480,114 B2 * | 1/2009 | Cherubini | G11B 5/59688 360/73.12 |
| 7,529,061 B2 * | 5/2009 | Bui | G11B 5/584 360/77.12 |
| 7,538,969 B2 * | 5/2009 | Weber | G11B 5/584 360/77.12 |
| 7,839,599 B2 * | 11/2010 | Bui | G11B 5/584 360/75 |
| 7,876,521 B2 | 1/2011 | Cherubini et al. | |
| 7,903,368 B2 * | 3/2011 | Bui | G11B 5/584 360/48 |
| 7,920,356 B2 * | 4/2011 | Bui | G11B 5/584 360/77.12 |

(Continued)

FOREIGN PATENT DOCUMENTS

WO 2011003677 A1 1/2011

OTHER PUBLICATIONS

G. Cherubini, et al., "LPOS Symbol Detection by Soft-Output Combining of Dual Synchronous Servo Channels in Tape Drives," 20th ASME Conference on Information Storage and Processing Systems,Jun. 2010, archive vol. 17, Issue 5-7, Jun. 2011, pp. 857-862.

(Continued)

*Primary Examiner* — Wayne Young
*Assistant Examiner* — James L Habermehl
(74) *Attorney, Agent, or Firm* — Cantor Colburn LLP

(57) ABSTRACT

An apparatus for operating a tape storage device comprises a tape skew estimation unit for estimating a value related to a skew of a tape storage medium arranged in the tape storage device relative to a head module of the tape storage device. A servo pattern decoder is configured to decode information encoded in a servo pattern written to one or more servo bands of the tape storage medium based on read-back signals of at least two servo readers of the tape storage device arranged for reading the servo pattern from the one or more servo bands and based on the estimated skew related value.

20 Claims, 3 Drawing Sheets

(56) References Cited

U.S. PATENT DOCUMENTS

| | | | |
|---|---|---|---|
| 7,957,088 B1 * | 6/2011 | Bui | G11B 5/584 360/76 |
| 7,961,421 B1 | 6/2011 | Bui et al. | |
| 7,990,644 B2 | 8/2011 | Bui et al. | |
| 8,000,057 B2 | 8/2011 | Bui et al. | |
| 8,023,223 B2 * | 9/2011 | Bui | G11B 5/584 360/75 |
| 8,054,569 B2 * | 11/2011 | Bui | G11B 5/584 360/48 |
| 8,054,576 B2 * | 11/2011 | Bui | G11B 5/584 360/76 |
| 8,271,857 B2 * | 9/2012 | Kabelac | G11B 27/107 714/771 |
| 8,331,055 B2 | 12/2012 | Cherubini et al. | |
| 8,576,510 B2 * | 11/2013 | Cherubini | G11B 5/584 360/77.12 |
| 8,611,039 B2 * | 12/2013 | Fasen | G11B 5/49 360/77.12 |
| 8,615,689 B2 * | 12/2013 | Kabelac | G11B 27/107 714/711 |
| 8,891,199 B2 * | 11/2014 | Cherubini | G11B 5/584 360/77.12 |
| 2010/0226037 A1 | 9/2010 | Bui et al. | |
| 2013/0321949 A1 | 12/2013 | Cherubini et al. | |

OTHER PUBLICATIONS

IP.com, "LPOS for Timing-Based-Servo With Trinary Partial-Response Maximum-Likelihood," IP.com, IPCOM000176068D, Nov. 4, 2008, pp. 1-6.

IPO, UK Search Report; Application No. GB1406870.4; Patents Act 1977: Search Report Under Section 17(5); Date Mailed: Sep. 18, 2014; pp. 1-4.

* cited by examiner

SKEW ESTIMATION FOR A TAPE STORAGE DEVICE

FOREIGN PRIORITY

This application claims priority to Great Britain Patent Application No. 1406870.4, filed Apr. 16, 2014, and all the benefits accruing therefrom under 35 U.S.C. §119, the contents of which in its entirety are herein incorporated by reference.

BACKGROUND

The present invention relates to an apparatus and to a method for operating a tape storage device, and to a related computer program product.

In tape storage systems, data typically is written to and read from a tape inserted into a tape storage device, which is also referred to as tape drive. The tape may be preformatted into data bands and servo bands extending next to each other in a motion direction of the tape. The servo bands comprise pre-recorded servo patterns representing servo information which may be read by a servo reader of a head module for gaining information about a longitudinal position of the tape and a lateral position of the tape with respect to a reference position. Lateral in this context is meant orthogonal to a reference motion direction of the tape. A deviation of the lateral position from the reference position is also denoted as position error signal PES in this technical field. Such information, and specifically the PES, may be provided to a feedback controller, also denoted as lateral position feedback controller, which converts the PES into a control signal for a realigning between the tape head and the data tracks that are currently read or written for enabling a correct reading and writing of data. As a result, a closed-loop control system for a continuing alignment of the tape head and the tape is provided, which is also denoted as a closed-loop track-follow control system.

In state-of-the-art tape storage systems, additional information is encoded in the servo patterns of a servo band. For example, information as to the longitudinal position of the tape (which is also referred to as LPOS information) may be encoded. Such LPOS information may be encoded within a plurality of servo frames forming an LPOS word and may be obtained from the servo pattern without affecting the generation of the lateral position error signal and longitudinal velocity information.

In many tape storage systems, at least two servo bands are provided. At least two corresponding servo readers supply read-back signals when simultaneously reading the servo patterns from the at least two servo bands. In a preferred approach, the two servo bands at the top and the bottom of a data band are read simultaneously. Any additional information encoded into the servo bands may be derived from each of the servo bands. In one embodiment, the additional information may be derived by a dedicated servo channel. If the performance of the dedicated servo channel degrades, then the additional information may be derived from any of the other servo channels. However, in another embodiment, the additional information may be derived from a combination of the read-back signals of the two servo readers instead of switching the servo channel to overcome any performance degradation of the dedicated servo channel.

SUMMARY

In one aspect, an apparatus for operating a tape storage device includes a tape skew estimation unit configured to estimate a value related to a skew of a tape storage medium arranged in the tape storage device relative to a head module of the tape storage device; and a servo pattern decoder configured to decode information encoded in a servo pattern written to one or more servo bands of the tape storage medium based on read-back signals of at least two servo readers of the tape storage device arranged for reading the servo pattern from the one or more servo bands and based on the estimated skew related value.

In another aspect, a method for decoding information encoded in a servo pattern written to one or more servo bands of a tape storage medium includes estimating a value related to a skew of the tape storage medium relative to a head module; receiving a read-back signal from a first servo reader when reading the servo pattern written to a first servo band of the tape storage medium; receiving a read-back signal from a second servo reader when reading the servo pattern written to the first servo band or when reading the servo pattern written to a different servo band of the tape storage medium; and decoding information encoded in the servo pattern based on at least the read-back signals of the first and the second servo reader and based on the estimated skew related value.

In another aspect, a non-transitory, computer readable storage medium having computer readable instructions stored thereon that, when executed by a computer implement a method for decoding information encoded in a servo pattern written to one or more servo bands of a tape storage medium includes estimating a value related to a skew of the tape storage medium relative to a head module; receiving a read-back signal from a first servo reader when reading the servo pattern written to a first servo band of the tape storage medium; receiving a read-back signal from a second servo reader when reading the servo pattern written to the first servo band or when reading the servo pattern written to a different servo band of the tape storage medium; and decoding information encoded in the servo pattern based on at least the read-back signals of the first and the second servo reader and based on the estimated skew related value.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

Figure 1:
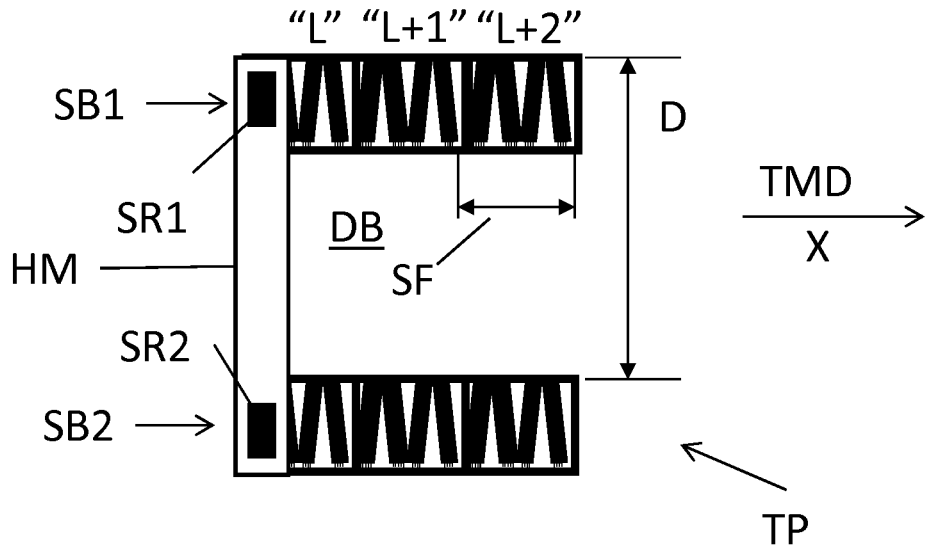
FIG. 1 is a cutout of a tape storage system according to an embodiment of the present invention in a first operational mode.

According to an embodiment of one aspect of the invention, an apparatus for operating a tape storage device is provided comprising a tape skew estimation unit for determining a value related to a skew of a tape storage medium arranged in the tape storage device relative to a head module of the tape storage device, and a servo pattern decoder configured to decode information encoded in a servo pattern written to one or more servo bands of the tape storage medium, based on read-back signals of at least two servo readers of the tape storage device arranged for reading the servo pattern from the one or more servo bands, and based on the estimated skew related value.

In embodiments, the apparatus may comprise one or more of the following features: the servo pattern decoder is configured to decode the information based on a combination of the read-back signals of the at least two servo readers arranged for reading the servo pattern from at least two different servo bands; the tape skew estimation unit is configured to estimate the skew related value in form of an offset in time between an appearance of a specific servo frame of the servo pattern in the at least two read-back signals, and the servo pattern decoder comprises a delay unit for delaying the read-back signal determined to be ahead in time of the other read-back signal dependent on the determined offset in time; the servo pattern decoder is configured to combine the delayed read-back signal and the other read-back signal into the combined read-back signal; the servo pattern decoder is configured to combine the delayed read-back signal and the other read-back signal into the combined read-back signal dependent on a signal quality index assigned to each read-back signal, and is configured to decode the information from the combined read-back signal.

According to an embodiment of another aspect of the invention, a tape storage system is provided comprising a tape storage device for reading and writing to a tape storage medium when arranged in the tape storage device, the tape storage device comprising a head module comprising at least two servo readers for reading servo patterns written to one or more servo bands of the tape storage medium, and an apparatus for operating a tape storage device according to any one of the preceding embodiments.

In an embodiment of the tape storage system, the tape storage medium comprises at least two servo bands along a longitudinal extension of the tape storage medium for supporting to determine positional information, and a data band between each two servo bands. Each servo band comprises a servo pattern containing servo frames, each servo frame comprising at least one servo burst with stripes in at least two different orientations. The at least two servo readers are arranged at a distance from each other for reading from different servo bands assigned.

According to an embodiment of another aspect of the present invention, a method is provided for decoding information encoded in a servo pattern written to one or more servo bands of a tape storage medium. A value related to a skew of the tape storage medium relative to a tape head is estimated. A read-back signal from a first servo reader is received when reading the servo pattern written to a first servo band of the tape storage medium. A read-back signal from a second servo reader is received when reading the servo pattern written to the first servo band or when reading the servo pattern written to a different servo band of the tape storage medium. Information encoded in the servo pattern is decoded based on at least the read-back signals of the first and the second servo reader and based on the estimated tape skew related value.

In embodiments, the method may comprise one or more of the following features: the skew related value is one of an offset in time, a distance, an angle; the skew related value is compared to a first threshold, and the usage of a combination of the read-back signals of the first and second servo reader into a combined read-back signal is approved if the skew related value is less the first threshold; the skew related value is compared to a second threshold, in case the skew related value is above the second threshold the read-back signal being ahead in time of the other read-back signal is first delayed by a delay value derived from the skew related value, then the read-back signals of the first and the second servo reader are combined into the combined read-back signal; the first threshold exceeds the second threshold, and the comparison of the skew related value to the second threshold is applied only if the skew related value proved to be less than the first threshold; the information is decoded from the combined read-back signal; the skew related value is determined as an offset in time or a distance between the appearance of a specific servo frame of the servo pattern in the read-back signals of the first and the second servo reader, and the specific servo frame encodes the last bit of a synchronization mark of an LPOS word used for encoding the information in the or each servo band.

According to an embodiment of another aspect of the present invention, a computer program product is provided comprising a computer readable medium having computer readable program code embodied therewith, the computer readable program code comprising computer readable program code configured to perform a method according to any one of the preceding embodiments.

It is understood that method operations may be executed in a different order than listed in a method claim. Such different order shall also be included in the scope of such claim as is the order of operations as presently listed.

Embodiments described in relation to the aspect of an apparatus shall also be considered as embodiments disclosed in connection with any of the other categories such as the method, the computer program product, etc.

In the figures, same or similar elements are denoted by the same reference signs. As an introduction to the following description, it is first pointed at a general aspect of the invention.

Servo information is prewritten on servo bands of a magnetic tape storage medium, or tape for short, and read by dedicated servo readers. Servo information may be used for determining a lateral position and a velocity of the tape. Servo bands represent longitudinal bands on the tape which alternate with data bands. There may be one, two or more servo bands provided on the tape. Each servo band preferably contains a servo pattern that is prerecorded. During operation of the tape storage device, the servo patterns of at least one servo band are read by a servo reader of a head module the tape is moved across. The information encoded in the servo pattern and read by the servo reader allows determining one or more of a longitudinal position and a lateral position of the tape with respect to the head module when crossing the servo reader.

FIG. 1 schematically illustrates a cutout of a tape storage system comprising a tape TP passing a head module HM for reading and writing data from/to the tape TP. The tape TP comprises servo information prerecorded in servo bands SB1, SB2 that extend next to data tracks for storing data. A multitude of data tracks arranged in between the two servo bands SB1, SB2 is referred to as data band. The servo bands SB1, SB2 as well as the data band DB extend in a longitudinal direction X along the tape TP which preferably coincides with a tape motion direction TMD of the tape in operation. In the present embodiment, the two servo bands SB1 and SB2 are arranged at a distance D from each other—also referred to as servo band pitch. Each servo band SB1, SB2 is read by a dedicated servo reader SR1, SR2 of a head module HM, which head module HM is part of a tape drive, also referred to as tape storage device, into which a cartridge containing the tape is inserted to. The servo band SB1 is read by the servo reader SR1, and the servo band SB2 is read by the servo reader SR2.

The servo information read by one or more of the servo readers from one or more of the servo bands allows for determining a lateral deviation of the tape. A corresponding position error signal PES may be translated into a control signal for a lateral position actuator for controlling the lateral position of the head module with respect to the tape. A positioning accuracy of such track-follow control system may have impact on the density data can be written to tape since the displacement allowed finally determines the density at which data tracks can be packed onto the tape and can be reliably written and read. The data is written and read by data writers and readers not shown in FIG. 1; those would typically be arranged in between the servo readers SR1 and SR2 in the head module HM.

Each servo band SB1, SB2 contains a servo pattern the servo information is encoded into. Preferably, and as is shown in FIG. 1, each servo band SB1, SB2 contains a servo pattern with sequences of parallel magnetically oriented stripes of different azimuth slopes. These servo patterns may follow a technology called timing-based servo (TBS). In TBS systems, recorded servo patterns comprise of transitions with at least two different azimuthal slopes. The lateral position of the head module HM is derived from the relative timing of pulses generated by the servo reader SR1 and/or SR2 reading the assigned servo pattern/s. The servo pattern may, for example, be written on five dedicated servo bands that straddle four data bands. The complete format for linear tape open LTO tape drives of the first generation was standardized by the European Computer Manufacturers Association (ECMA) in 2001 as ECMA-319. Reference is made to this source for gaining more insight about the timing based servo patterns.

The servo pattern in each servo band SB1, SB2 comprises servo frames SF labeled L, L+1, L+2 in FIG. 1. A servo frame SF is understood as a subset of the pattern, and in the present case comprises a first burst of five stripes representing magnetic transitions with a first azimuthal slope, followed by a second burst of five stripes representing magnetic transitions with a second azimuthal slope, followed by a third burst of four stripes representing magnetic transitions with the first azimuthal slope, and followed by a fourth burst of four stripes representing magnetic transitions with the second azimuthal slope.

Within such TBS pattern, additional information may be encoded such as information related to a longitudinal position of the tape, also referred to as LPOS. In one embodiment, such information may be encoded in the servo bands of the tape by shifting transitions/stripes from their nominal positions. In one embodiment, a single LPOS word in the LTO format contains 36 LPOS bits and one bit of LPOS information is encoded in every servo frame SF. In the example of FIG. 1, servo frames L, L+1 and L+2 are shown representing three consecutive LPOS bits.

Except for information that is servo band specific such as a servo band identifier, it is preferred that each servo band is written with the same information, and hence essentially with the same servo pattern. Hence, at each longitudinal position of the tape the same servo frame should be written to each servo band. It is preferred that the servo patterns in the various servo bands correspond to each other, at least with respect to the information that is to be decoded by the present apparatus and method. Therefore, when it comes to decoding such information, the different servo bands provide redundant information which preferably is made use of in the decoding procedure. With respect to FIG. 1, read-back signals of the two servo readers SR1, SR2 reading from the two different servo bands SB1, SB2 are evaluated and/or used for decoding the information encoded into the servo patterns of the servo bands SB1 and SB2.

In one embodiment, each read-back signal is provided with a signal quality index indicating a signal quality and/or reliability. In the following, each read-back signal may be weighted according to the signal quality index and the weighted read-back signal may contribute to a combined read-back signal according to its weight. Of course, in some occasions this may lead to the usage of only a single read-back signal in case the other one is deteriorated. In a different embodiment, the read-back signals may be combined at a fixed ratio. In another variant, the read-back signals may alternately be combined.

Figure 2:
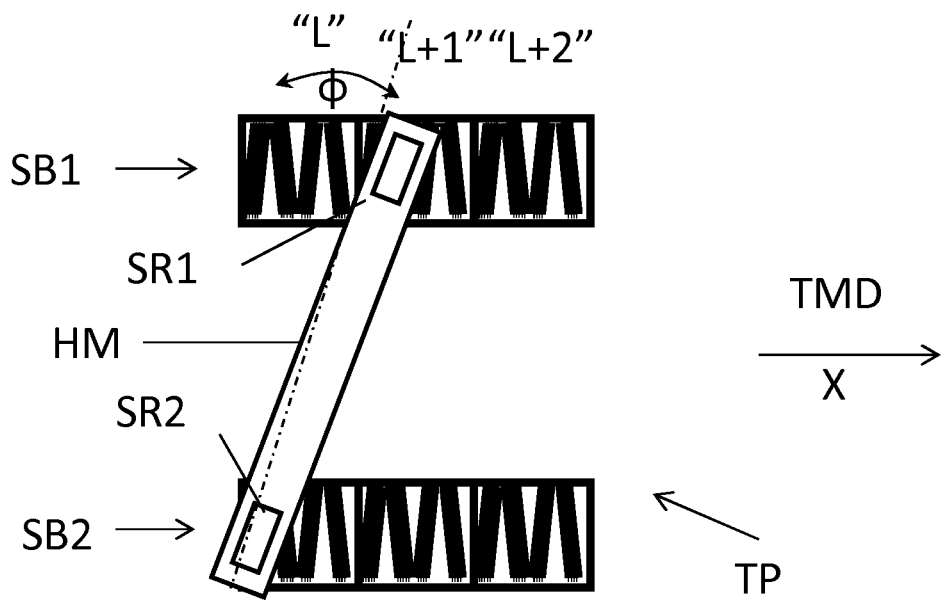
FIG. 2 is a cutout of a tape storage system according to an embodiment of the present invention in a second operational mode.

However, whenever two or more read-back signals from the corresponding servo readers are combined for improving signal quality and/or for other purposes, tape skew may impact the decoding as will be shown with respect to FIG. 2. FIG. 2 illustrates the effect of tape skew on the reliability of information decoded from combined read-back signals. According to the above, each servo frame SF may represent a bit of information, such as LPOS information. Combining the corresponding bits of the different servo bands SB1, SB2 under the assumption that those bits contain the same information requires those bits to be simultaneously read. However, this cannot be accomplished when the amount of tape skew exceeds an azimuth angle limit, e.g., of 4 degrees for the LTO format. In FIG. 2, the top servo reader SR1 already detects servo frame "L+1" in its read-back signal while the bottom servo reader SR2 at the same time only detects servo frame "L". When the read-back signals of the two servo readers SR1 and SR2 are combined in this case, signal portions stemming from two different bits are combined, which leads to unreliable detection.

Tape skew, or in short skew, is generally understood as a rotational displacement of the tape with respect to a head module of the tape storage device, which rotational displacement occurs in a plane of the tape. In general, skew may represent an angle between the tape motion direction and a rotational orientation of the head module, i.e., an orientation defined in a plane parallel to the plane of the tape. For determining any skew, the tape motion direction may be determined, which shall include measuring or any indirect determination of the tape motion direction. Hence, skew as such shall refer to both the rotational displacement of the motion direction of the tape versus the rotational orientation of the tape head, and to the rotational displacement of the motion direction of the tape versus a reference motion direction of the tape. The reference motion direction of the tape may be considered as a direction the tape ideally moves across the tape head given that the tape head is ideally oriented. Preferably, the reference motion direction is orthogonal to the ideal orientation of the tape head, and in absolute terms is parallel to an ideal tape path envisaged by rollers, flanges etc. in the tape storage device.

Skew may have various reasons; in traditional tape storage systems, flanged rollers are used for constraining a lateral tape motion during a transport of the tape from a supply reel to a take-up reel or vice versa. Although the use of flanged rollers constrains the tape and limits lateral tape motion during operation, debris accumulation may be introduced at the flanges that not only may affect the lifetime of the tape, but may also create undesirable dynamic effects due to a contact of the tape edge with guiding elements such as flanges. These effects may be alleviated by removing the flanges from the rollers and operating the tape path without guiding elements. However, such approach may introduce new challenges: Removing the guiding elements also removes a constraint on the lateral motion of the tape, which may result in an increase in amplitude of a typically low-frequency lateral tape motion. Specifically, an effect denoted as stack shift may become more prominent. Stack shifts are due to tape-stacking irregularities in the cartridge reel and lead to lateral tape motion events during normal operation of the drive. In general, stack shifts appear as high-amplitude low-frequency disturbances that can repeatedly be observed at the same longitudinal position when using the same cartridge. An increased amplitude of a lateral tape motion may in addition increase a tape skew, which in turn may degrade the performance of the tape storage device. FIG. 2 illustrates such skew wherein the head module HM is rotationally displaced by skew angle Φ from the tape motion direction TMD.

Figure 3:
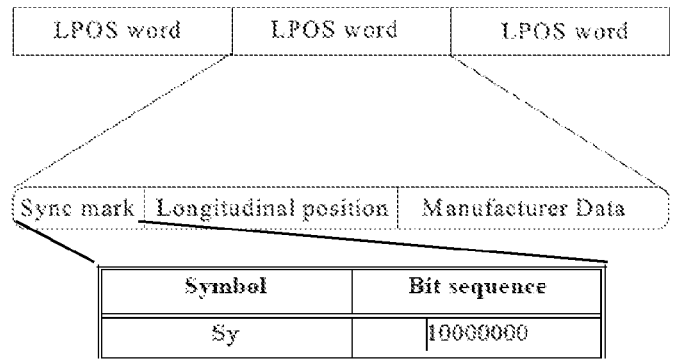
FIG. 3 is a data protocol as used in linear tape open (LTO) specification.

Tape skew may be estimated in various ways, and may be represented by one of an angle, a distance, or a time interval also referred to as offset in time, given that it denotes the difference in time the same bit, servo frame, or other pattern subset occurs in the read-back signals of the various servo readers. In one embodiment, the offset in time may be measured directly by applying pattern recognition to the two or more read-back signals. In a very preferred embodiment, the pattern subset that is monitored is a synchronization pattern for an LPOS word encoded in the servo pattern. Encoded words may be separated from each other by a synchronization mark, which indicates the beginning of a new LPOS word and which may contain a pattern subset that is unique within the servo pattern. Preferably, the "Sync Mark" encoded in each LPOS word is used as pattern subset that is monitored for skew determination purposes. The structure of an LPOS word is depicted in FIG. 3 along with the definition of the synchronization mark containing the bit sequence '10000000'. Hence, in this embodiment, a new tape skew value may be estimated every time a new synchronization mark indicates a new LPOS word.

The offset in time Δt and the tape skew angle Φ relate to each other by $$\Phi = \arctan(v\Delta t/D)$$

wherein D is the distance between the two servo readers SR1, SR2 which at the same time represents the distance D between the two servo bands SB1 and SB2, and wherein v denotes the velocity of the tape TP at which the tape TP is moved across the head module HM in tape motion direction TMD.

In response to an identification of the "Sync Mark" detection interval as a measure of the offset in time the read-back signals of the various servo readers can be adapted such that signal components contributing to the same bits are combined. In the specific case of LPOS, an LPOS detection logic can adjust the timing to align LPOS information from the two or more servo channels. The information obtained from the detection of the "Sync Mark" interval can also be utilized to suspend/resume combining LPOS in case of excessive skew.

Figure 5:
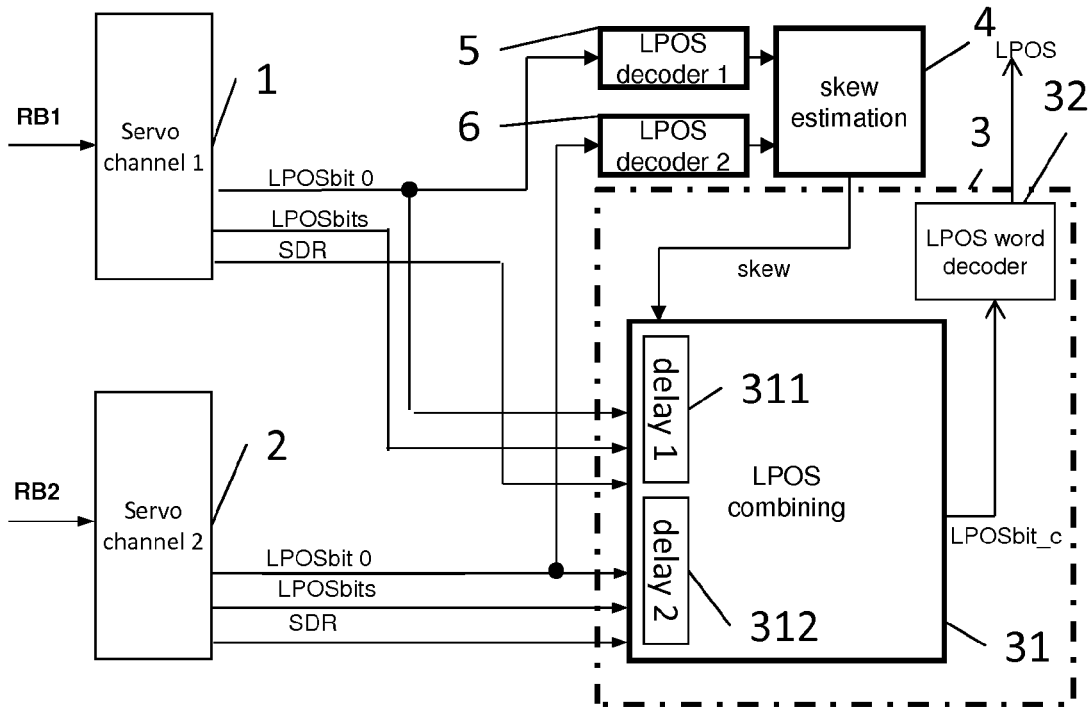
FIG. 5 is a block diagram of an apparatus according to an embodiment of the present invention.

FIG. 5 depicts a block diagram of an apparatus for operating a tape storage device according to an embodiment of the present invention. The read-back signals RB1, RB2 of two servo readers are received by an associate servo channel 1, 2 each for preprocessing. Each servo channel 1, 2 may output various signals, only a selection of which is shown in FIG. 5. One output may provide the "LPOS bits" to a servo pattern decoder 3, which in this specific embodiment may contain logic 31 for combining the preprocessed read-back signals delivered by the servo channels 1, 2, namely the "LPOS bits". A further output "SDR" for each servo channel 1, 2 indicates a signal-to-distortion ratio for each read-back signal. The "SDR" may be considered as a signal quality index and as such indicate the quality of the corresponding read-back signal RB1, RB2, for example, on a predefined scale. In the LPOS combining logic 31 the preprocessed read-back signals of the two servo channels 1, 2 are combined. In one embodiment, each preprocessed read-back signal preferably is weighted according to the signal quality index represented by the "SDR" output and contributes to a combined read-back signal "LPOSbit_c" according to its weight. The combined read-back signal "LPOSbit_c" is forwarded to an LPOS word decoder 32 for decoding purposes, i.e., for finally extracting the present longitudinal position LPOS of the tape that is encoded in the presently read LPOS word.

The preprocessed read-back signals are additionally supplied to assigned LPOS decoders 5, 6 wherein the LPOS bits are decoded specifically for the purpose of identifying the LPOS word boundaries, e.g., by identifying the "Sync Marks". In a subsequent tape skew estimation unit 4, skew related information is obtained by measuring a time interval—also referred to as offset in time—between the LPOS word boundaries, e.g., "Sync Marks", identified in the LPOS decoders 5, 6. The time interval is supplied as "skew" value to the logic 31, preferably at a rate of words encoded into the servo pattern.

In case a significant skew is detected in the skew estimation unit 4, one of the read-back signals, preferably present in its preprocessed form, is delayed versus the other read-back signal. In the present example, either the first read-back signal RB1 is delayed in delay unit 311, or the second read-back signal RB2 is delayed in delay unit 312 prior to combining the two read-back signals RB1, RB2 in the combination logic 31. By means of delaying one of the read-back signals RB1, RB2, an offset in time induced by tape skew is compensated such that the read-back signals are realigned and the corresponding bits of the read-back signals are properly combined.

A translation of the skew value—which may be represented by one of an angle, a distance, or an offset in time—into a delay value may be effected either in the skew estimation unit 4 such that the skew value supplied to the logic 31 may already receive a delay term that may immediately be applied. Or the translation of the skew value into a delay value may be effected by the logic 31. Even if the skew value already is defined in the time domain as offset in time, it may need to be converted into a measure acceptable by the delay units 311, 312, such as number of clock cycles, for example.

Figure 4:
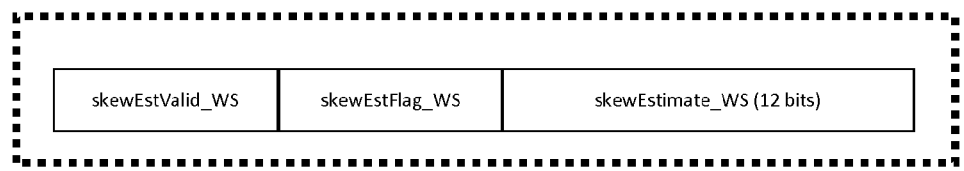
FIG. 4 is a register as used in a tape skew estimation unit according to an embodiment of the present invention.
Figure 6:
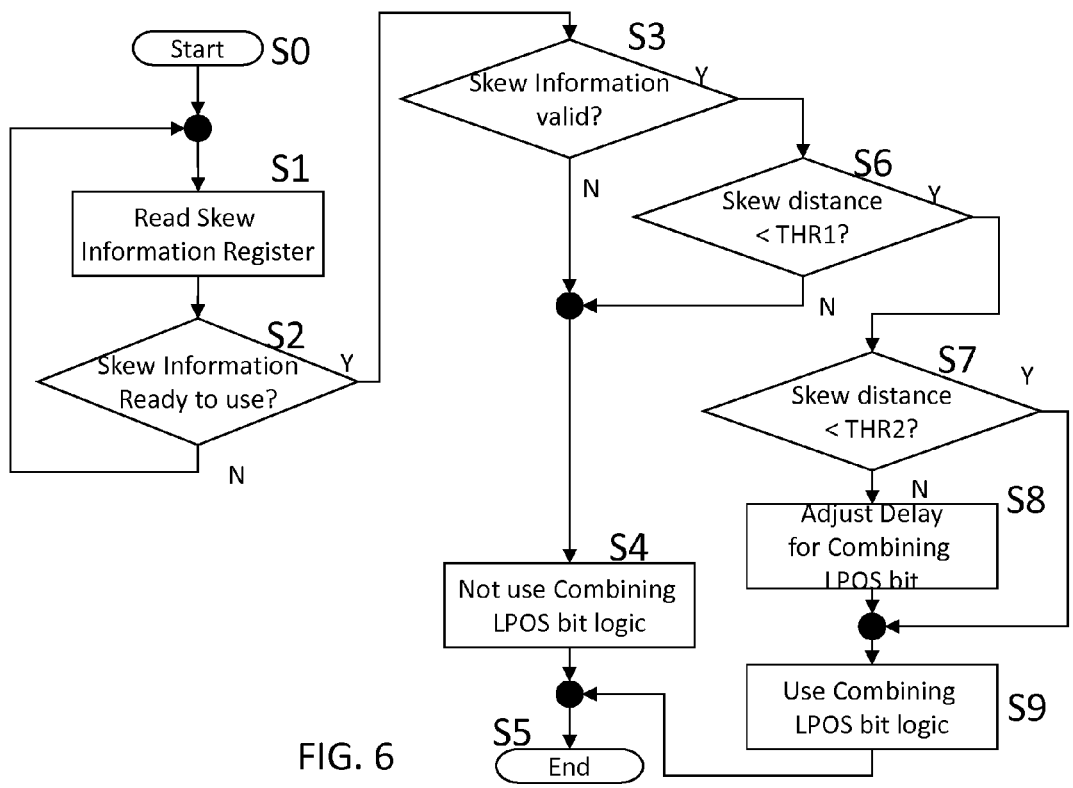
FIG. 6 is a flowchart illustrating a method according to an embodiment of the present invention.

FIG. 6 shows a flow chart of a method for determining the usage of LPOS combining logic based on the detected skew according to an embodiment of the present invention. In preparation of describing the method, it may be helpful to first switch to FIG. 4 illustrating an embodiment of a skew estimation register in a block diagram. The skew estimation register contains a first flag labeled as skewEstFlag_WS, a second flag labeled as skewEstValid_WS, and holds a value for a variable skewEstimate_WS (12 bits). The variable indicates the above mentioned offset in time, or, alternatively, a corresponding distance value, or, alternatively, a skew angle value, or another value indicating the skew. In one embodiment, the first flag is set as soon as both of the servo channels see servo frames received by each channel, indicating that skew estimation is enabled. In one embodiment, the second flag is set as soon as both of the servo channels have received a new "Sync Mark". The servo pattern decoder 3 of FIG. 5, which may be embodied either as software or as hardware or as a combination thereof, preferably reads the skew information register periodically, for example whenever a new skew estimate "skewEstimate_WS" becomes available, as indicated by the second flag.

According to the flow chart of FIG. 6, the method is started in block S0. In block S1, the skew information register is read. In block S2, it is verified if the skew information is available and ready to be used, i.e., if the first flag skewEstFlag_WS is set in the skew determination register. If not (N), the skew information register may be checked later on again. However, if so (Y), the validity of the skew is checked first in block S3. If the flags skewEstFlag_WS and skewEstValid_WS are set, which means that valid skew information in the skew information register is available (Y), it is switched to block S6. If the flags skewEstFlag_WS and skewEstValid_WS indicate that the skew information in the skew information register is invalid (N), the read-back signals are not combined, which in the present case means that LPOS bit combining is not used. In this scenario, the skew is considered invalid for a proper tape operation.

In block S6, it is verified if the skew value, i.e., the skewEstimate_WS value in the register according to FIG. 4 is smaller in absolute value than a threshold THR1 which may be set by the software before operation. If not (N), the read-back signals are not combined, which in the present case means that LPOS bit combining is not used. In this scenario, the skew is valid and may be used for normal tape operation, but is considered as too large for combining the LPOS bits. However, if the skew absolute value—also referred to as skew distance—is found to be less than the first threshold THR1 (Y), it is verified in the next block S7 if the skew distance is less than a second threshold THR2 (Y) which may be set by the software before operation. If so (Y), the read-back signals may be combined without any additional delay. However, if the skew distance is equal to or more than the second threshold THR2 (N), an additional delay term is applied in block S8 to one of the read-back signals prior to the LPOS bit combining. In block S9, the read-back signals are combined before the method terminates in block S5.

In a preferred embodiment for LTO drives, the second threshold THR2 is set at a skew value that corresponds to a skew distance of half of a servo frame. If the skew is smaller than THR2, the registered metrics for the detection of a bit encoded in the two servo patterns are simultaneously available for a certain time interval. Hence metric combining for bit detection can take place without buffering the previous metric values provided by the servo channel that leads in time. If the skew is larger than THR2 and smaller than THR1, delaying of the metrics for combined bit detection requires the buffering of M previous metrics provided by the servo channel that leads in time, where M is equal to the integer number of half servo frames corresponding to the estimated skew value.

Figure 7:
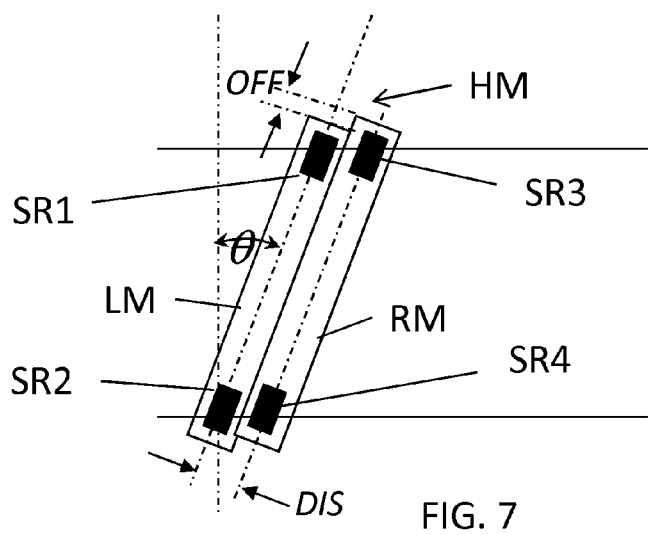
FIG. 7 is a head module as used in a tape storage system according to another embodiment of the present invention.

While the above embodiments make use of at least two different servo bands to read the read-back signals from, in a different embodiment the at least two servo readers may read from a single servo band. FIG. 7 shows a cutout of a head module HM skewed relative to a tape. In this example, the head module HM comprises a left module LM and a right module RM, each equipped with a servo reader SR1-SR4 for reading from each servo band, where the left module LM and the right module RM may have a mechanical offset "OFF". The skew may be estimated solely from the servo readers reading from the same servo band: For instance, when a distance "DIS" between left module LM and the right module RM is 1 mm long, a relative skew angle $\Phi$ of 4° degree corresponds to a mechanical offset "OFF" of about 69 um. Even in this case, the above described method based on the observation of the "Sync Mark"s from top/bottom servo channels can still be applied to achieve reliable LPOS combining by proper alignment of the LPOS metrics from top/bottom servo channels.

The tape skew may also be estimated by different means than the ones explained above. For example, the tape skew may be obtained by using a lateral position measurement by means of a dedicated sensor, for example, by means of optical sensors which may be placed in the tape path prior to the tape head. In an example making use of such a dedicated sensor for determining lateral position information of the tape, at least one tape edge of the tape is observed. At least two consecutive lateral tape positions are determined dependent on the at least one observed tape edge. This facilitates a reliable determination of the current lateral tape position by other means than reading the servo information. Alternatively, if data has been written to tape before with negligible skew, the skew between the tape head and the tape can be measured by utilizing the detection by the data channels of synchronization fields embedded into the data streams. In particular, each data channel contains logic to detect the presence of synchronization fields in the data streams read from individual data tracks. The synchronization fields are normally written simultaneously onto all data tracks, such that they are physically aligned in the absence of skew during the write process. During readback, time differences between the detection of the synchronization fields in the data streams read from the data tracks can be measured.

In another embodiment, the tape skew value may not only be used for impacting the decoding of servo information. Additionally, the tape skew value provided by the skew estimation unit 4 may be used in an enhanced closed-loop skew control system for controlling a suitable skew actuator for adjusting the skew in dependency from the estimated tape skew value, possibly in combination with further skew estimates obtained by alternative means, as explained above. The skew actuator may be an actuator acting on a rotational orientation of the head module. In such embodiment, the head module may have a rotational bearing, and a rotational position of the head module with respect to the tape may be modified by actuating the skew actuator. However, the skew actuator may act on other means, too, such as on a tilting of rollers for guiding the tape.

Embodiments of the present invention may include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. An apparatus for operating a tape storage device, comprising:
   a tape skew estimation unit configured to estimate a value related to a skew of a tape storage medium arranged in the tape storage device relative to a head module of the tape storage device; and
   a servo pattern decoder configured to decode information encoded in a servo pattern written to one or more servo bands of the tape storage medium based on read-back signals of at least two servo readers of the tape storage device arranged for reading the servo pattern from the one or more servo bands and based on the estimated skew related value.

2. The apparatus of claim 1, wherein the servo pattern decoder is configured to decode the information based on a combination of the read-back signals of the at least two servo readers arranged for reading the servo pattern from at least two different servo bands.

3. The apparatus of claim 1, wherein:
   the tape skew estimation unit is configured to estimate the skew related value in form of an offset in time between an appearance of a specific servo frame of the servo pattern in the at least two read-back signals; and
   the servo pattern decoder comprises a delay unit for delaying the read-back signal determined to be ahead in time of the other read-back signal dependent on the estimated offset in time.

4. The apparatus of claim 3, wherein the servo pattern decoder is configured to combine the delayed read-back signal and the other read-back signal into the combined read-back signal.

5. The apparatus of claim 4, wherein the servo pattern decoder is configured to combine the delayed read-back signal and the other read-back signal into the combined read-back signal dependent on a signal quality index assigned to each read-back signal, and is configured to decode the information from the combined read-back signal.

6. A tape storage system, comprising:
a tape storage device configured to read and write to a tape storage medium when arranged in the tape storage device, the tape storage device comprising a head module comprising at least two servo readers for reading servo patterns written to one or more servo bands of the tape storage medium; and
the apparatus for operating a tape storage device of claim 1.

7. The tape storage system of claim 6, further comprising:
a tape storage medium comprising at least two servo bands along a longitudinal extension of the tape storage medium for supporting to determine positional information, and comprising a data band between each two servo bands;
wherein each servo band comprises a servo pattern containing servo frames, each servo frame comprising at least one servo burst with stripes in at least two different orientations; and
wherein the at least two servo readers are arranged at a distance from each other for reading from different servo bands assigned.

8. A method for decoding information encoded in a servo pattern written to one or more servo bands of a tape storage medium, the method comprising:
estimating a value related to a skew of the tape storage medium relative to a head module;
receiving a read-back signal from a first servo reader when reading the servo pattern written to a first servo band of the tape storage medium;
receiving a read-back signal from a second servo reader when reading the servo pattern written to the first servo band or when reading the servo pattern written to a different servo band of the tape storage medium; and
decoding information encoded in the servo pattern based on at least the read-back signals of the first and the second servo reader and based on the estimated skew related value.

9. The method of claim 8, wherein the skew related value is one of: an offset in time, a distance, and an angle.

10. The method of claim 8, wherein:
the skew related value is compared to a first threshold; and
the usage of a combination of the read-back signals of the first and second servo reader into a combined read-back signal is approved if the skew related value is less the first threshold.

11. The method of claim 8, wherein:
the skew related value is compared to a second threshold; and
in case the skew related value is above the second threshold the read-back signal being ahead in time of the other read-back signal is first delayed by a delay value derived from the skew related value, and then the read-back signals of the first and the second servo reader are combined into the combined read-back signal.

12. The method of claim 11, wherein:
the first threshold exceeds the second threshold; and
the comparison of the skew related value to the second threshold is applied only if the skew related value proved to be less than the first threshold.

13. The method of claim 11, wherein the information is decoded from the combined read-back signal.

14. The method of claim 8, wherein:
the skew related value is estimated as an offset in time or distance between the appearance of a specific servo frame of the servo pattern in the read-back signals of the first and the second servo reader; and
the specific servo frame encodes the last bit of a synchronization mark of an LPOS word used for encoding the information in the or each servo band.

15. A non-transitory, computer readable storage medium having computer readable instructions stored thereon that, when executed by a computer implement a method for decoding information encoded in a servo pattern written to one or more servo bands of a tape storage medium, the method comprising:
estimating a value related to a skew of the tape storage medium relative to a head module;
receiving a read-back signal from a first servo reader when reading the servo pattern written to a first servo band of the tape storage medium;
receiving a read-back signal from a second servo reader when reading the servo pattern written to the first servo band or when reading the servo pattern written to a different servo band of the tape storage medium; and
decoding information encoded in the servo pattern based on at least the read-back signals of the first and the second servo reader and based on the estimated skew related value.

16. The storage medium of claim 15, wherein the skew related value is one of: an offset in time, a distance, and an angle.

17. The storage medium of claim 15, wherein:
the skew related value is compared to a first threshold; and
the usage of a combination of the read-back signals of the first and second servo reader into a combined read-back signal is approved if the skew related value is less the first threshold.

18. The storage medium of claim 15, wherein:
the skew related value is compared to a second threshold; and
in case the skew related value is above the second threshold the read-back signal being ahead in time of the other read-back signal is first delayed by a delay value derived from the skew related value, and then the read-back signals of the first and the second servo reader are combined into the combined read-back signal.

19. The storage medium of claim 18, wherein:
the first threshold exceeds the second threshold; and
the comparison of the skew related value to the second threshold is applied only if the skew related value proved to be less than the first threshold.

20. The storage medium of claim 18, wherein the information is decoded from the combined read-back signal.

* * * * *